C. T. RAY.
SEED HOPPER.
APPLICATION FILED JAN. 2, 1915.
1,220,684.
Patented Mar. 27, 1917.
3 SHEETS—SHEET 1.
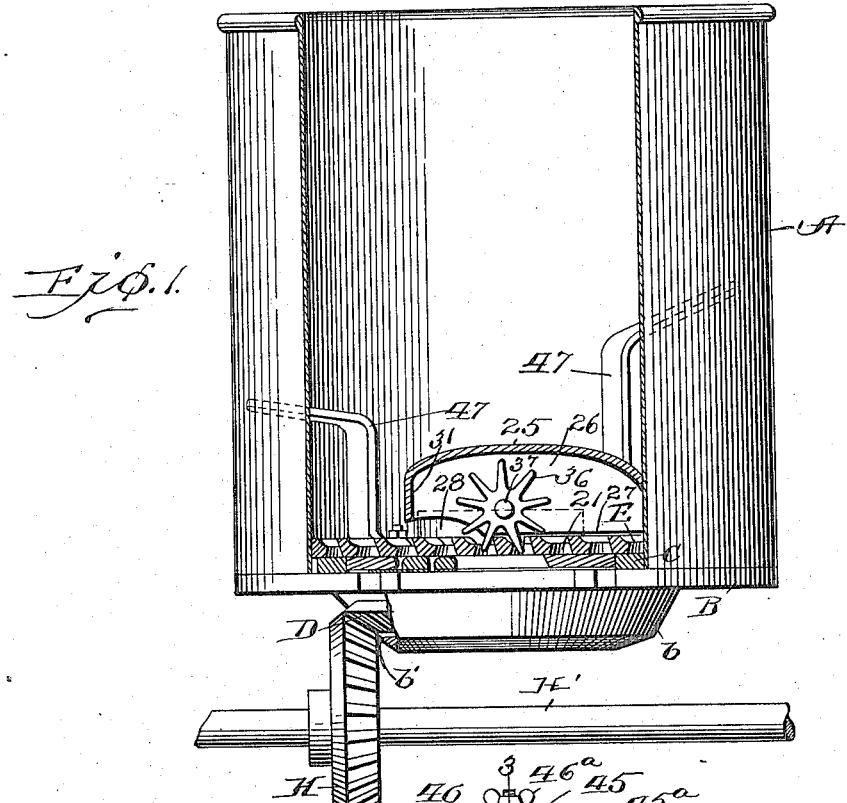
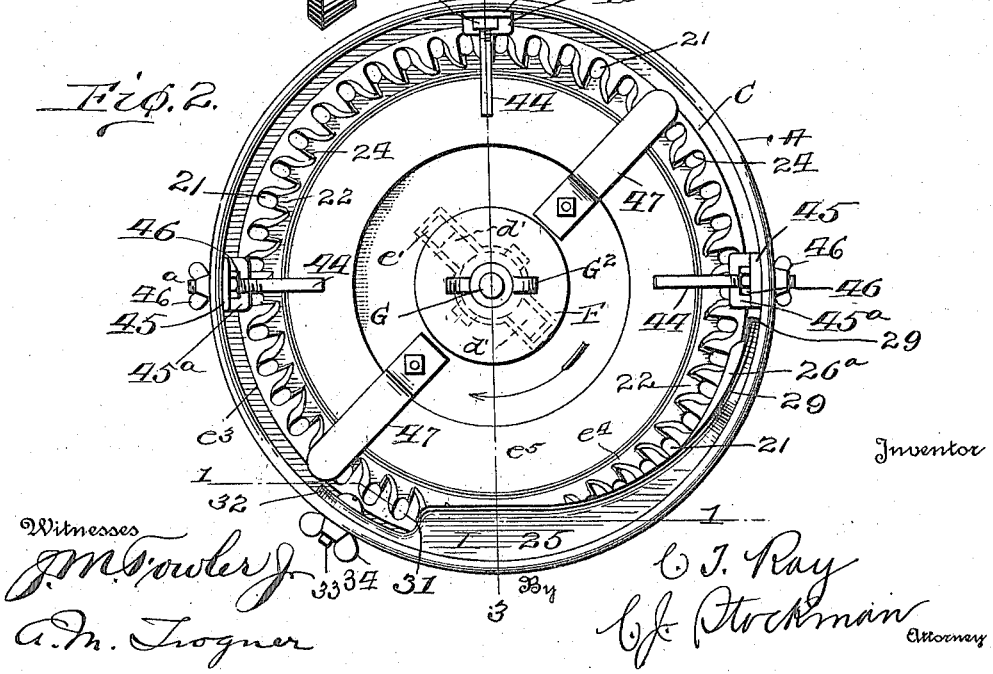

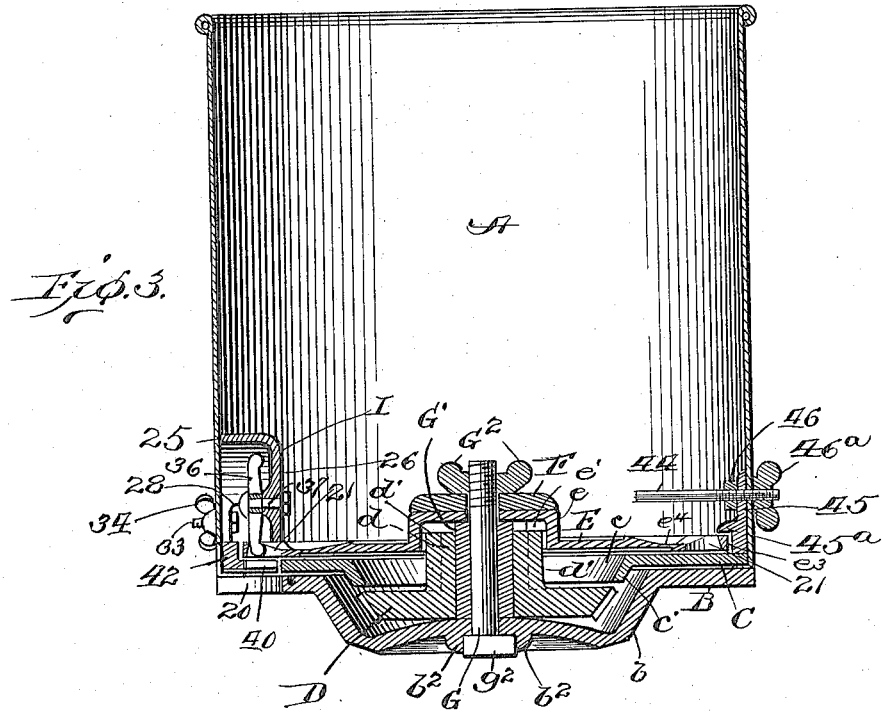
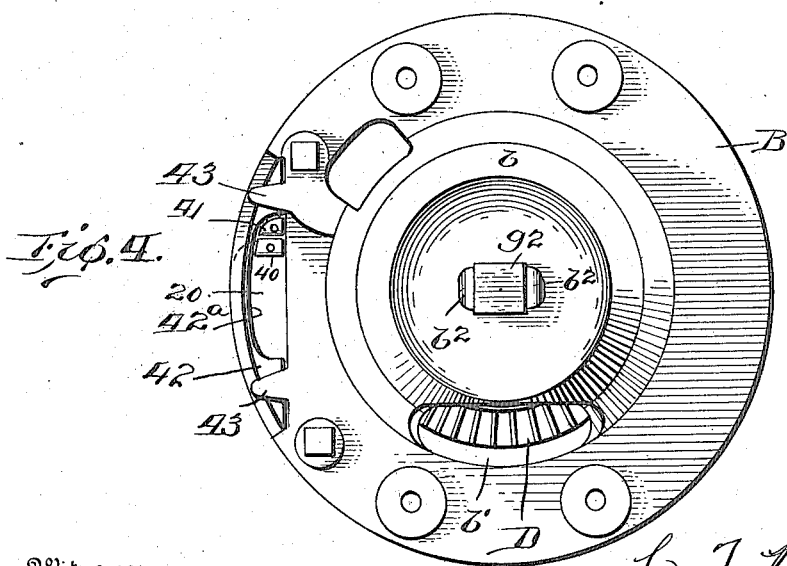

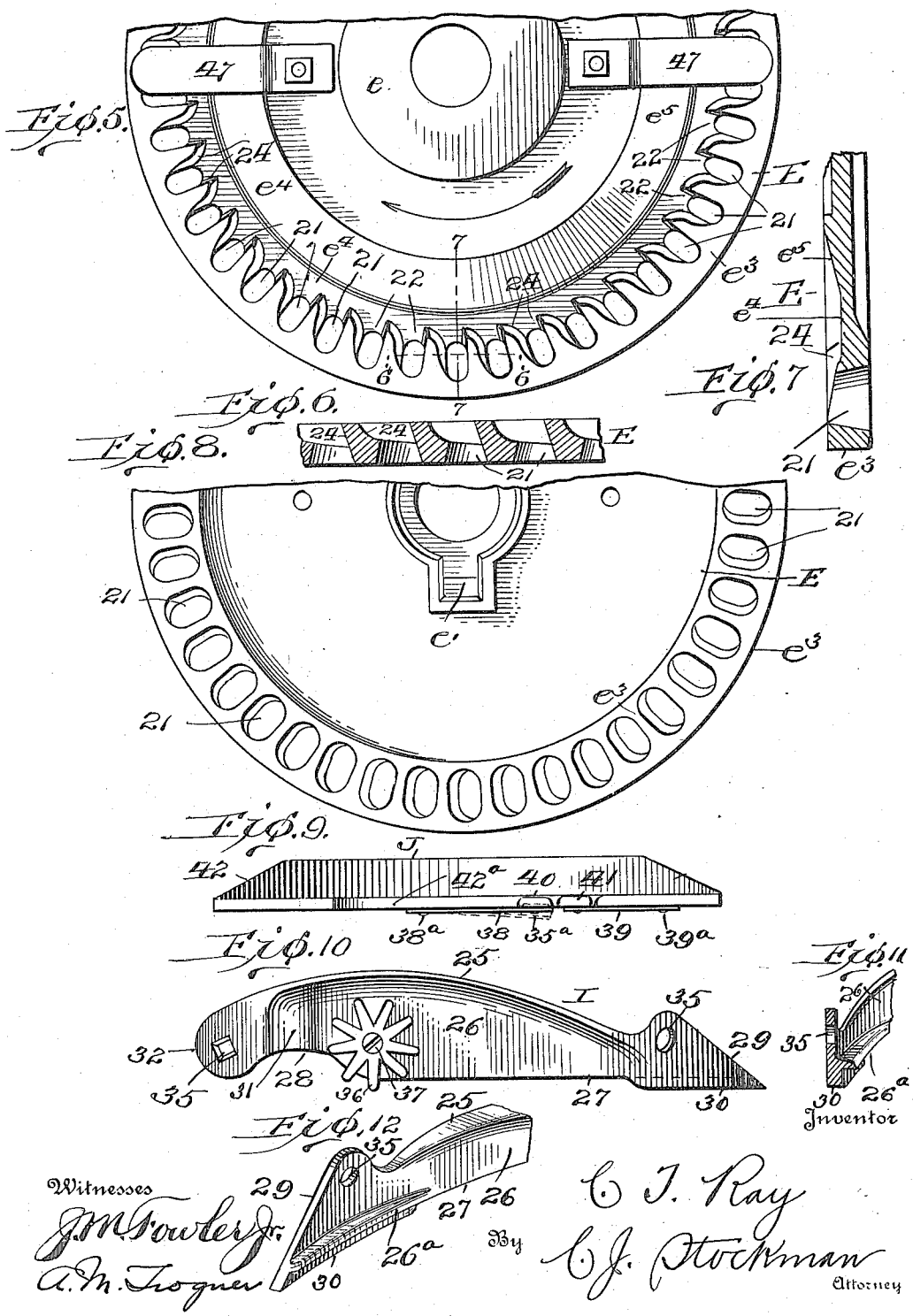

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

SEED-HOPPER.

1,220,684.

Specification of Letters Patent. Patented Mar. 27, 1917.

Application filed January 2, 1915. Serial No. 98.

*To all whom it may concern:*

Be it known that I, CHARLES T. RAY, a citizen of the United States, residing at Louisville, in the county of Jefferson and State of Kentucky, have invented new and useful Improvements in Seed-Hoppers, of which the following is a specification.

This invention relates to certain new and useful improvements in seed planters, and particularly in seed dropping mechanism associated with the hoppers or seed containers thereof. As herein embodied the seed dropping mechanism is particularly useful for the planting of cotton seeds but certain features of the invention have utility in the planting of other seeds—such as corn, for example—and the invention therefore should not be construed as being restricted to the planting of cotton seeds alone.

One of the most important purposes of the present invention is to provide a seed planting mechanism which will be simple in its construction and certain in its operation and will enable the farmer to get a stand with a minimum amount of seed per acre, by causing the seed to be discharged singly with maximum regularity and by reducing to a minimum the danger of breaking the seed.

Another of the important purposes of the invention is to provide a seed dropping mechanism, including a rotative seed plate having openings for individual seeds, with a yieldable means so correlated with the seed plate that it will either free from the plate or return to openings therein all seeds which have been partially ejected from the openings, the said means being of such character that danger of cracking or breaking the seeds is avoided and it will return to the openings in the seed plate only the seeds which are securely held to the plate.

Still another of the important purposes of the present invention is to provide a seed dropping mechanism, including a rotative seed plate having cells for individual seeds, with a means so correlated with the cells that it will effectually and without danger of cracking or breaking any of the seeds force back toward the center of the plate all surplus seeds which are partially lodged in cells.

There are other purposes and advantages of the present invention which will be apparent to those familiar with the construction and operation of seed dropping mechanisms from the following description of the preferred embodiment of the present invention, it being understood that changes may be made in the details without departing from the spirit of the invention or the scope of the subjoined claims.

In the accompanying drawings, wherein like characters of reference denote corresponding parts in the several views:—

Figure 1 is a view partly in elevation and partly in section, the line of section being indicated at 1—1 Fig. 2, of a hopper comprising the present improvements: this figure also showing a desirable means for transmitting movement from a shaft of the planter to the seed plate in the hopper, a part of the hopper bottom being broken away to show the interengagement of the gears;

Fig. 2 is a plan view of the hopper;

Fig. 3 is a vertical section on the line 3—3 of Fig. 2;

Fig. 4 is an inverted plan view of the hopper;

Fig. 5 is a plan view of a part of the seed plate drawn to a larger scale than the preceding figures;

Fig. 6 is a section, to a still larger scale, on the line 6—6 of Fig. 5;

Fig. 7 is a section on the line 7—7 of Fig. 5, drawn to a yet larger scale;

Fig. 8 is a plan view of the underside of a part of the seed plate;

Fig. 9 is a detail view of the seed protector;

Fig. 10 is a detail representation, in elevation, of the guard, viewed from the side adjacent the wall of the hopper, showing also the star wheel carried by the guard;

Fig. 11 is a detail sectional view of one end of the guard;

Fig. 12 is a detail perspective view of said end of the guard.

The seed container preferably employed is most clearly shown in Fig. 3. It comprises a body A having a separately formed bottom B and a disk or plate C arranged immediately above the bottom B. The bottom B is preferably formed with a depression $b$ in which is mounted a horizontally disposed gear D having a hub $d$ provided with radial arms or wings $d'$. The disk or plate C has an axial opening $c$ immediately above the gear D. This opening $c$ preferably has its wall formed by an annular depending flange $c'$ which extends to the upper surface of the gear D and conforms to the flange forming the depressed portion $b$ of the bottom B.

E designates a rotatable seed plate. This plate is of disk form and is mounted immediately above the disk or plate C. The particular plate herein shown has an axial raised hub $e$ with lateral offsets $e'$ forming seats for the respective arms or wings $d'$ projecting from the hub $d$ of the gear D, whereby movement of the gear is transmitted to the seed plate. A washer F is preferably arranged immediately above the hub of the seed plate E. The gear D and the seed plate E are preferably held in their proper position by a pivot bolt G having a sleeve G', the said sleeve resting at its bottom on the lower wall of the depressed portion $b$ of the bottom and having its top engaged with the under surface of the raised part $e$ of the seed plate. A wing nut $G^2$ above the washer F and the bolt-head $g^2$ below the portion $b$ of the bottom, coöperate in holding the bolt, the said portion $b$ also preferably having flanges $b^2$ which engage the polygonal sides of the head $g^2$ and prevent axial movement of the bolt.

The gear D may desirably receive motion from a gear H which is mounted on an appropriate shaft H' with which the planter is provided. The depressed portion $b$ of the hopper bottom B has at one side an opening shown at $b'$ through which the gear H has access to the gear D.

The bottom B and the disk or plate C are provided with registering openings arranged in the peripheral portions thereof. These registering openings provide the outlet 20 for the seeds discharged from the seed plate.

The seed plate E is formed around its peripheral portion with a series of seed cells, each cell being formed of an opening 21 through which the seed therein is ejected when the outlet 20 is reached and a passage 22 through which surplus seed on top of the plate and partly in a cell may be forced toward the center of the plate by the guard I hereinafter described. Preferably, the seed plate has a thickened peripheral portion $e^3$ within which the openings 21 and passages 22 are formed, the thickened portion providing a flange which extends above the horizontal plane of the adjacent part $e^4$ of the body of the plate and whose inner edge has apertures which form the open inner ends of the passages. The seed plate, moreover, preferably also has an annular section $e^5$ concentric with the section $e^4$ and whose upper surface is inclined upwardly from the section $e^4$, the said section $e^5$ giving an outward tendency toward the wall of the container to the flow of the mass of seed and hence facilitating the supply of the seeds to the seed cells. The seed cells lie wholly within the boundaries of the thickened part $e^3$ of the plate, the periphery of the plate being continuous or uninterrupted. The walls of the openings 21 and passages 22 preferably are so arranged that each opening 21 is larger at its bottom than at its top and each passage is wider at its top than at its bottom where it joins the opening 21 and also is of gradually widening dimension from its outer end to its open inner end.

In order that the surplus seeds may be freely forced back onto the body of the plate through the open inner ends of the passages by the guard I, the seed cells are arranged radially and the walls 24 of the passages 22 are beveled in opposite directions at the mouths of the passages. Hence, seeds which are lodged in the passages may be readily forced out of the passages back toward the center of the plate when the guard I is reached, as no obstruction to such movement of the seed is presented by the walls of the passages.

The guard I, hereinbefore referred to, comprises a top wall 25 and a longitudinal wall 26 so arranged with relation to the wall of the container and the seed plate that a covered passage is formed, the said passage extending from a point which is in advance of the outlet opening 20 and is adjacent to the outer ends of the seed cells gradually inward to a place which is beyond, or is at the far end of, the said opening 20 and adjacent to the open inner ends of the passage 22: the said longitudinal wall 26 being curved somewhat spirally and having its lower edge 27 adjacent to the upper surface of the seed cells. Hence, the guard prevents choking of the outlet 20 and aids in securing a uniform discharge of the seed singly through said outlet by sweeping gradually back toward the center of the plate any surplus seed which is partly in a cell, the shape of the passages 22 together with the gradual forcing of the seed back therefrom avoiding danger of cracking or breaking of the seeds. This danger is further prevented by arranging the upper wall 25 of the guard at an incline upwardly from the entrance to the passage. The lower longitudinal edge 27 of the plate preferably engages the upper surfaces of the walls 24, except at a place adjacent to the far end of the outlet 20, where the lower portion of said wall is formed with an opening, shown best at 28 in Fig. 10, through which any seed which has passed the outlet 20 without being ejected through the latter may pass back into the container. At the end 29, which is at the entrance to the passage within the guard, the guard has a rounded lip $26^a$ arranged above the peripheral edge of the seed plate—that is, at the outer ends of the seed cells—and also has a depending flange 30 which extends between the periphery of the seed plate and the wall of the container. The lower edge of the lip 30 is arranged in the same horizontal plane as and joins the lower edge of the inwardly extending part of the wall 26 so that it forms a part of the lower edge 27 hereinbefore referred to. The inwardly extending portion of the guard (that is, that part thereof whose wall 26 is of somewhat spiral curvature so as to gradually recede from the outer edge of the seed plate and the wall of the container) extends from the end portion 29 to a place adjacent the far end of the outlet 20, whereat the guard extends somewhat abruptly toward the wall of the container, as shown at 31, and terminates in a flange 32 which rests against the wall of the container. The guard is suitably secured to the wall of the container, fastening bolts 33 and wing nuts 34 being preferably employed for this purpose, the said bolts extending through apertures 35, 35 in the ends 29 and 32 of the guard.

The opening 28 is formed in the part 31 of the guard, and near this part there is arranged a freely rotatable ejecting wheel 36. The arms of this wheel extend into the seed cells successively presented thereto by the rotation of the seed plate, and the wheel is rotated by its engagement with said cells. This wheel is journaled upon a shaft 37 carried by the wall 26 of the guard. The purpose of this wheel is to force the seed downward from said cells into the outlet 20.

In order to prevent crushing against the edge of the outlet 20 of any seed which has been partially but not wholly ejected from a cell a seed protecting means J is arranged in the portion of the outlet immediately beyond the ejecting wheel. This protecting means underlies the seed plate and is so disposed that it engages the portion of the seed which is protruding from the cells and yields downwardly thereto, its correlation to the seed cells being such that seed which is lightly held to the plate by the lint, as sometimes happens, will be knocked sufficiently to free the same from the plate, while seed which is more securely held to the plate by the lint, as frequently happens, will be engaged by the protecting means and held while the plate passes over the same, the elasticity of the protecting means enabling it to yield when engaged by a seed so that the plate may pass over the seed without cracking the latter and also enabling the protecting means to press said seed up into the next vacant cell passing over the same. I have found in practice that the best results are secured from the use of a protector having a plurality of independently yieldable sections arranged adjacent to each other, one after the other, immediately below the portion of the plate provided with said cells. These sections preferably consist, respectively, of spring arms 38 and 39 having secured ends 38ª and 39ª and their other ends free and provided with heads or projections 40 and 41, the said heads or projections being formed with upward rounded surfaces to engage the seeds.

The use of this seed protecting means is important in the planting of cotton seeds, but may be dispensed with when hard seeds, as corn, are being planted. Accordingly, it is preferred, to provide for the easy removal of the seed protecting means from and its quick application to the container. Preferably, therefore, the arms 38 and 39 are secured to a support 42 which when cotton seeds are being planted is mounted in the opening 20 and rests upon lugs 43 formed on the bottom B near the opposite ends of the opening 20. This support is formed with an opening 42ª within which the ejecting wheel 37 operates and through which the seeds pass.

44 designates fingers which are suitably secured to the body A and project inwardly into the container and are arranged immediately above the seed plate E. These fingers retard the flow of seed and force the seed into the cells. The seed plate E is held against wabbling by elements 45, having inwardly extending flanges 45ª disposed over the upper surface of the seed plate. These elements are suitably secured to the body A with their lower edges between said body and the periphery of the seed plate. In practice, it is preferred to utilize them as means for stiffening the body A at the places where the fingers 44 are secured to said body. Hence, as shown in Fig. 3, the outer ends of the fingers extend through the upper ends of the elements 45, as well as through the body A, and are provided with nuts 46 and 46ª for securing the fingers and the elements 45 to the body A.

47 designates stirrer arms whose lower ends are suitably secured to the seed plate E. These stirrer arms extend upwardly within the container and have their upper ends bent outward toward the body A, as shown.

From the foregoing the operation of the device will readily be understood to be as follows:

The container or hopper being provided with seeds to be planted and the seed plate being rotated in the direction of the arrow, the seed cells which are not under the guard I are gravitatingly supplied with individual seeds from the mass resting thereon, these seeds being carried beneath the guard I and the latter sweeping toward the center or axis of the seed plate surplus seed resting upon the cells without injury to the seeds, as already explained, the particular arrangements of the seed cells and correlations of the walls bounding the same facilitating the latter operations and also facilitating the supply of the cells with seeds. The rotation of the seed plate successively presents the seeds in the cells to the action of the ejecting wheel, under the top wall 25 of the guard, the seeds resting upon the plate C during their travel to the outlet opening 20. The seeds which are ejected from the cells by said wheel fall through the opening 20; other seeds which are lightly held by the lint being by contact with the seed protector J knocked from the plate and falling through said outlet while still other seeds partly protruding from the cells but more securely held to the seed plate by the lint are forced into succeeding vacant cells by the spring action of the seed protector, the last named seeds, and any others which may have passed the outlet 20 without being ejected, being carried through the opening 28 near the end of the guard, to be later ejected.

Having now described the invention what I believe to be new and desire to secure by Letters Patent, is:—

1. A seed container having an outlet, a yieldable seed protector adjacent to said outlet and a rotatably mounted seed plate having openings arranged to communicate successively with the outlet, said seed protector being arranged under the seed plate and in the path of seeds protruding from the openings in the latter.

2. A seed container having an outlet, a rotatably mounted seed plate having openings arranged to communicate successively with the outlet, and a seed protector adjacent to the outlet, said protector comprising a plurality of independently yieldable members arranged adjacent to each other and coöperatively returning to the seed cells all seeds which are firmly bound to the plate and partially protrude therefrom.

3. A seed container having an outlet, a rotatably mounted seed plate having openings arranged to communicate successively with the outlet, and a seed protector adjacent to the outlet, said seed protector comprising a yieldable member disposed in the path of seeds which are passing beyond the outlet and are tightly bound to and protrude from the seed plate, the protector further comprising a second member, arranged in advance of the first mentioned member and contiguous thereto, the second member being disposed in the path of all the seeds and freeing the more lightly bound seeds from the seed plate and pressing the others back toward the plate.

4. A seed container having an outlet, a rotatably mounted seed plate having openings arranged to communicate successively with the outlet, and a seed protector adjacent to the outlet, said seed protector having a yieldable head which engages all the seeds which protrude from the seed plate and have not previously passed into the outlet, and a yieldable member arranged after said head and contiguous thereto and passing into the seed cells the protruding seeds which have been pressed toward the plate by said head.

5. A seed container having an outlet, a rotatably mounted seed plate having openings arranged to communicate successively with the outlet, and a seed protector comprising a plurality of independently yieldable arms having free ends provided with rounded projections or heads which are arranged one after the other adjacent to the outlet and in the path of seeds protruding from the openings in the seed plate.

6. In combination, a seed container having an outlet, a rotatably mounted seed plate provided with seed openings arranged to communicate successively with the outlet, an ejector arranged to force seeds from the seed openings adjacent to the outlet and a yieldable seed protector arranged beyond the ejector and adjacent to the outlet and in the path of seed protruding from the seed plate.

7. In combination, a seed container having an outlet, a rotatably mounted seed plate provided with seed openings arranged to communicate successively with the outlet, a downwardly acting ejector arranged to force seeds from the seed openings adjacent to the outlet and a downwardly yieldable seed protector arranged beyond the ejector and beneath the seed plate and in the path of seed protruding from the openings in the seed plate.

8. A seed container having an outlet and a seed protector arranged adjacent to the outlet and comprising a body or carrier having an opening which communicates with the outlet and a downwardly yieldable seed-engaging element in the opening.

9. A seed container having an outlet and a seed protector arranged adjacent to the outlet and comprising a body or carrier having an opening which communicates with the outlet and a plurality of elements having seed-engaging heads in the opening, the said heads being independently yieldable downward.

10. A seed container having a bottom plate provided with an outlet and projections adjacent to said outlet, and a seed protector removably supported on said projections and comprising a body or carrier having an opening which communicates with the outlet and a yieldable seed engaging element at one end of said opening.

11. A seed container having a bottom plate provided with an outlet and projections adjacent to said outlet, a seed plate having openings which successively register with the outlet, and a seed protector removably supported on said projections and comprising a body or carrier having an opening which communicates with the opening in the bottom plate and a yieldable seed-engaging means having a plurality of independently yieldable seed-engaging elements which are disposed adjacent to each other at one end of said opening and coöperatively act to press toward the seed plate such seeds as have passed the outlet and are too tightly bound to the plate to be freed by the protector.

12. In combination, a seed container having an outlet, a rotatably mounted seed plate provided with seed openings arranged to communicate successively with the outlet, a guard mounted over the outlet and arranged to force surplus seeds away from the seed openings in the seed plate, an ejector arranged to force seeds from the seed openings adjacent to the outlet and a yieldable seed protector arranged beyond the ejector and in the path of seed protruding from the seed plate.

13. In combination, a seed container having an outlet, a rotatably mounted seed plate provided with seed openings arranged to communicate successively with the outlet, a guard mounted over the outlet and arranged to force surplus seeds away from the seed openings in the seed plate, a downwardly acting ejector mounted in the guard and arranged to force seeds from the seed openings adjacent to the outlet and a downwardly yieldable seed protector arranged beyond the ejector and adjacent to the outlet opening and immediately below the openings in the seed plate.

14. A seed container having an outlet, a rotatably mounted seed plate having openings arranged to communicate successively with the outlet, a guard arranged to form a passageway adjacent to the outlet, the guard having beyond the outlet an opening to the container, downwardly acting ejecting means in said passageway in advance of the opening in the guard and adjacent to the outlet, and a yieldable means arranged adjacent to the outlet and between the ejecting means and opening in the guard, the said yieldable means protecting the seeds and pressing the tightly held protruding seeds back into the seed openings.

15. A seed container having an outlet, a rotatably mounted seed plate having seed openings arranged to communicate successively with the outlet, a guard arranged to form a passageway adjacent to the outlet, the guard having beyond the outlet an opening to the container, an ejecting wheel arranged in the passageway in advance of the opening in the guard and adjacent to the outlet, and a yieldable seed protector arranged adjacent to the outlet and under the seed openings in the seed plate and between the ejecting wheel and opening in the guard.

16. A seed container having an outlet, a rotatably mounted seed plate having seed openings arranged to communicate successively with the outlet, a guard arranged to form a passageway adjacent to the outlet, the guard having a longitudinal wall which extends gradually toward the center of the plate from the outer ends of the seed openings and serves to sweep surplus seeds away from the seed openings, the guard also having beyond the outlet an opening to the container, an ejecting wheel arranged in the passageway in advance of the opening from the guard and adjacent to the outlet, and a seed protector comprising a plurality of independently yieldable sections arranged adjacent to the outlet and under the seed openings in the seed plate and between the ejecting wheel and opening in the guard.

17. A seed plate having near its periphery a series of seed discharge openings all of which point to the axis of the plate and passages through which the surplus seeds are discharged toward the center of the plate, said passages communicating with the openings and having open mouths at their inner ends, the walls of the mouths being oppositely beveled to facilitate the discharge of the surplus seeds therethrough.

18. A seed plate comprising a disk having near its periphery a series of seed discharge openings all of which point to the axis of the disk and passages through which the surplus seeds are discharged toward the axis of the disk, said passages communicating with the openings and having open mouths at their inner ends, the walls of the mouths being oppositely beveled to facilitate the discharge of the surplus seeds therethrough and the disk having concentric annular sections, one of said sections being adjacent to the passages and disposed below the plane of the upper surfaces of the walls of the passages and the other section being inclined upward from the first section and arranged between the same and the axis of the disk.

19. A seed container having an outlet, a seed plate movable rotatably relatively to the seed container and having a series of seed cells which successively communicate with the outlet, the lower ends of the seed cells forming discharge openings, all of which point to the axis of the plate, the upper portions of the cells forming passages whose lower ends are disposed above and communicate with the discharge openings, said passages having open mouths at their lower ends, the walls of the discharge openings and passages being so correlated that each opening is larger at its bottom than at its top and each passage is wider at its top than at its bottom: combined with a means correlated with the seed plate to force the surplus seed gradually toward the center of the plate through said mouths.

20. A seed container having an outlet, a seed plate movable rotatably relatively to the seed container and having a series of seed cells which successively communicate with the outlet, the lower ends of the seed cells forming discharge openings all of which point to the axis of the plate, the upper portions of the cells forming passages whose lower ends are disposed above and communicate with the discharge openings, said passages having open mouths at their lower ends, the walls of the discharge openings and passages being so correlated that each opening is larger at its bottom than at its top and each passage is wider at its top than at its bottom: combined with a guard mounted over the outlet and having an inner longitudinal wall whose lower edge is contiguous to the upper surface of the seed plate, the said wall extending gradually toward the axis of the plate from a place adjacent to the outer ends of the seed cells to a place near the open inner ends of the latter, a downwardly acting ejector mounted within the guard, the guard having an opening at its end beyond the ejector, and a yieldable seed protecting means disposed under the seed cells and between the ejector and the opening in the guard, said seed protecting means being adapted to force back into the cells such seeds as have not been freed therefrom.

21. A seed container having an outlet opening, a rotatably mounted seed plate having seed openings which successively communicate with the outlet and have open inner ends, and a guard mounted over the outlet and having an inner longitudinal wall which extends gradually inward from a place approximately in line with the outer ends of the seed openings to a place approximately in line with the open inner ends of the same and whose lower edge is contiguous to the upper surface of the seed plate, and also having an upwardly inclined top wall which is of gradually widening dimension from its lower end to its upper end.

22. A guard for a seed container, having a top wall and a longitudinal side wall, the top wall being upwardly inclined from one end of the guard toward the other and of gradually widening dimensions to its higher ends and the side wall extending approximately in a spiral direction from one end of the guard toward the other and having an upwardly inclined upper edge adjacent to the edge of the top wall.

23. The combination with a seed container having an outlet and a seed plate rotatably mounted in the container and provided with seed cells which successively communicate with the outlet, of a guard arranged in the container and over the outlet, said guard having a lip arranged at one end thereof and disposed contiguous to the seed plate and also having a flange which extends downward from the lip and is disposed between the periphery of the plate and the wall of the container, the guard further having a front wall which is curved in approximately a spiral direction and has its lower edge arranged in substantially the same horizontal plane as the lower edge of the lip and joins the latter.

24. A guard for a seed container, comprising a top wall and a longitudinal front wall whose edges join each other, the said walls being relatively so arranged that the guard will be of gradually widening dimensions from one end to the other and of gradually increasing height from its narrow end to its wider end, one end of the guard also having a downwardly projecting lip and a rounded flange, the lower edge of the flange being disposed in front of the lip and arranged substantially in the same horizontal plane as and joining the lower edge of the front wall.

25. A guard for a seed container, having ends arranged to be secured to the body of the container and provided with a front wall which is so arranged that the guard will be of gradually widening dimensions from one of said ends and thence narrow somewhat abruptly to the other end, the latter part of the wall having an opening.

26. A guard for a seed container having ends arranged to be secured to the body of the container, the portion of the guard between said ends comprising top and front walls which join each other and are so arranged that the guard will be of gradually increasing height and gradually widening dimension from one of said ends and thence narrow somewhat abruptly to the other end, the latter part of the front wall having an opening.

27. A guard for a seed container, having ends arranged to be secured to the body of the container, one of said ends being provided with a downwardly projecting lip and a rounded front flange having its lower edge in front of the lip, the portion of the guard between said ends comprising top and front walls which join each other and are so arranged that the guard will be of gradually increasing height and gradually widening dimension from one of said ends and thence narrow somewhat abruptly to the other end, the latter part of the front wall having an opening and the remaining portion of the lower edge of the front wall being substantially in the same horizontal plane as, and joining the lower edge of said flange.

28. A seed plate having its peripheral portion provided with seed cells having passages which are open toward the center of the plate, in combination with a seed container having inward projections arranged to press the seeds into the seed cells and members engaging said projections and having lips which engage the plate, the said members also having portions which extend between the peripheral edge of the plate and the wall of the container.

29. In combination, a seed container having an outlet, a rotatable seed plate having seed openings which successively communicate with the outlet, a guard arranged adjacent to the outlet, said guard having a wall which gradually recedes from the wall of the container and is so correlated with the seed plate as to force surplus seeds gradually back toward the center of the plate from the seed openings, a freely rotatable ejecting wheel journaled upon said wall and projecting into the seed openings which are in communication with the outlet, and a yieldable seed protecting means disposed contiguous to the outlet in advance of the after end of the guard and after the ejecting wheel.

In testimony whereof I have hereunto set my hand in presence of two subscribing witnesses.

CHARLES T. RAY.

Witnesses:
J. K. SCOGGAN,
W. M. JOHNSTON.

Copies of this patent may be obtained for five cents each, by addressing the "Commissioner of Patents, Washington, D. C."